(12) United States Patent
Kopp et al.

(10) Patent No.: US 6,718,828 B2
(45) Date of Patent: Apr. 13, 2004

(54) WATERTIGHT PRESSURE SENSING DEVICE

(75) Inventors: Thomas Kopp, Wolfach (DE); Hermann Dieterle, Wolfach (DE); Ewald Bohler, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 10/252,684

(22) Filed: Sep. 24, 2002

(65) Prior Publication Data

US 2003/0177838 A1 Sep. 25, 2003

(30) Foreign Application Priority Data

Mar. 22, 2002 (DE) .......................... 102 12 903

(51) Int. Cl.[7] .............................................. G01L 7/10
(52) U.S. Cl. .............................. 73/730; 73/706; 73/756
(58) Field of Search ..................... 73/700, 706, 730, 73/753, 756

(56) References Cited

U.S. PATENT DOCUMENTS 4,924,701 A * 5/1990 Delatorre ................. 73/152.52
5,455,573 A * 10/1995 Delatorre ................. 340/854.8
5,711,863 A * 1/1998 Henkelmann et al. ...... 204/428

FOREIGN PATENT DOCUMENTS

| DE | 69 35 248   | 9/1969 |
| DE | 94 01 331.4 | 3/1994 |
| DE | 196 10 167 C1 | 2/1997 |

* cited by examiner

Primary Examiner—Edward Lefkowitz
Assistant Examiner—Jermaine Jenkins
(74) Attorney, Agent, or Firm—Nath & Associates PLLC; Gary M. Nath; Marvin C. Berkowitz

(57) ABSTRACT

Described is a sensing device, which is suspended in a filling material, particularly a liquid, by means of a cable 30. The cable 30 consists of a cable jacket of insulating material, a shielding jacket 32 of metal mesh beneath the cable jacket 31, and the electrical conductors connected to the sensor proper 11. In accordance with the invention, the shielding jacket 32 also serves to relieve pull. To this end, the end 33 that projects into the sensor housing 10 is exposed, i.e., is free of the insulating jacket material, and has a solid mechanical connection to the adapting piece 21 of a cable seat 20 inserted into the housing 10, and the connection is electrically conductive.

3 Claims, 1 Drawing Sheet

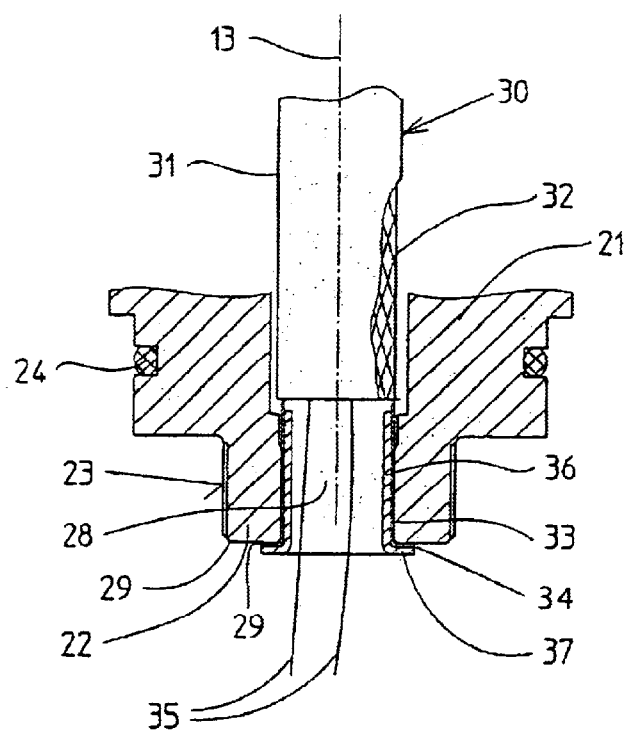
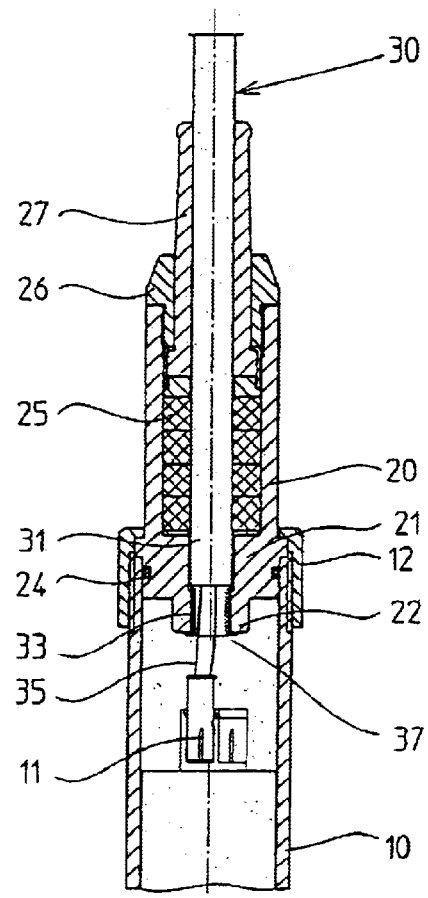
Fig. 2
Fig. 1

WATERTIGHT PRESSURE SENSING DEVICE

The invention relates to a watertight sensing device, primarily a pressure-sensing device, which can be suspended into the filling material, particularly into liquids.

In order to guarantee a lasting seal for the connecting cable of pressure sensors of this kind, it is necessary to relieve the seal from the pull of the sensor.

In the past this problem has been solved by allowing the weight of the sensor to be received by a steel wire provided inside of the connecting cable. The steal wire is usually secured inside the sensing device by means of a pressure sleeve, which is supported by a retaining plate belonging to the sensing device.

The electrically insulated connecting cable in such sensors must be provided with a shield, which usually consists of copper mesh and which is positioned below the insulating material of the cable jacket. To equalize the potential differences the shield is connected both to the metal housing of the sensor and to the ground of the control box.

In relieving pull it is also known to suspend the sensor within the filling material by means of an additional steel thread guided outside of the cable.

The use of an additional steel wire solely for the purpose of relieving pull is expensive.

The invention is thus based on the problem of simplifying a sensing device of the type indicated in the preamble to claim 1, specifically a device for which the relief from pull does not involve a relief wire.

This problem is solved with the features and measures indicated in claim 1.

The basic idea of the invention is to use the cable, which has no shielding, for the additional purpose of relieving pull, but without placing a load on the electrical conductors of the cable, which is not permissible under guidelines of the VDE (Association of German Electricians).

More specifically, the solution according to the invention consists in removing the insulating material of the outer cable jacket at that end of the shielding jacket that projects into the housing, and in securing this end in a hole bored in the sensor seat, specifically by means of a sleeve to be inserted into the end of the shielding jacket. To create a connection that is resistant to pull, another feature of the invention provides that the seat is inwardly compressed in the area of the sleeve inserted into the boring, a measure that reduces the cross-section and secures the shielding jacket.

With this kind of connection a secure electrical connection between the shielding and the sensor housing is assured; at the same time, the shielding itself serves to receive the pull of the sensor, and thus relieves the electrical conductors from pull.

According to claim 2, the seat will ideally exhibit a shoulder that narrows at the end protruding into the housing; with simple means and little force this shoulder can be pressed in a direction perpendicular to the center axis of the cable or sensor housing.

Another improvement in the attachment and the provision of electrical contacts is the subject matter of claim 3, according to which the outer rim of the sleeve, together with the end of the shielding jacket, is flanged in such a way that one face of the seat, specifically the shoulder of the seat, has a form-fitting, frictional connection.

The subject matter of the invention is described below in detail on the basis of a preferred exemplary embodiment, which is depicted in the drawing. The figures in the drawing show:

FIG. 1 an axial section of a sensor with cable.

FIG. 2 an enlarged detail of a sectional view of the cable seat, with an attached cable end.

FIG. 1 of the drawing shows in partial section a pressure-sensing device with a metal housing (10), inside of which a sensor (11) with a pressure-sensing element is positioned.

The connecting cable (30) runs through the cable seat (20), whose adapting piece (21) is attached by means of a screw cap (12) screwed to the upper end of the housing (10). An upwardly projecting cable socket (27) of elastic material, with the watertight cable (30) running through it, is secured to the upper end of the seat (20) by means of a screw ring (26). Cable sealing rings (25) of elastic rubber material are positioned inside the seat; the sealing rings are compressed in the axial direction by the screw ring (26) and provide a further seal for the cable guidance. The electrical conductors (35) of the cable (30) are connected to the sensor.

As can be seen from the enlarged detail provided by FIG. 2, the cable (30) has an external jacket (31) of electrically insulating material and below this a shielding jacket (32) of metal mesh, ideally copper mesh. At the end of the cable (30) that projects into the adapter (21) both the cable jacket (31) and the insulation inside the cable are removed, so that the shielding jacket is exposed in this terminal area. The coaxial hole (28) which lies inside the protruding shoulder (22) of the adapter (21) has dimensions that permit the free end (33) of the shielding jacket to rest tightly with its outer surface on the inner wall of the boring (28). Inserted completely into the end (33) of the shielding jacket is a metal sleeve, whose outer diameter corresponds to the inner diameter of the shielding jacket (32). The rim (37) of the sleeve that lies inside the housing (10) is flanged, so that when the sleeve (36) is inserted into the boring (38), the outer rim (34) of the end of the shielding jacket also becomes flanged and is pressed against the face (29) of the shoulder (22).

Further lasting attachment of the shielding jacket (32) is achieved when the outer jacket faces (23) of the shoulder (22) are pressed in the direction of the center axis (13). The result is a durable frictional connection between the shielding jacket (32) and the seat (20). The shielding jacket (32) thus serves to relieve pull on the cable (30). Since the adaptor (21) connects the seat (20) to the housing (10) in electrically conductive fashion this connection simultaneously serves as an electrical connection and thus as the necessary ground.

In a simple manner the shielding according to the invention thus provides both a secure relief from pull and an optimal electrical contact for the metal housing of the sensor.

List of Reference Numerals
10 metal housing
11 sensor
12 screw cap
13 center axis
20 seat
21 adapting piece
22 shoulder
23 outer jacket face
24 sealing ring
25 cable sealing rings
26 screw ring
27 cable socket
28 coaxial boring
29 face
30 cable
31 cable jacket
32 shielding jacket
33 end of shielding jacket
34 flanged end of shielding jacket

35 electrical conductors
36 sleeve
37 flanged rim of sleeve

What is claimed is:

1. A watertight sensing device, particularly a pressure-sensing device, to be suspended in filling material, consisting of a metal housing, a sensor positioned inside the housing, and a seat connected to the housing for conducting in watertight fashion a connection cable which is intended to relieve pull and is electrically connected to the sensor and mechanically connected to the housing and which exhibits a shielding jacket which consists of metal mesh and is connected to the housing for purpose of grounding, wherein on its end that projects into the housing (10) the seat (20) exhibits a coaxial boring (28) whose diameter corresponds to the outer diameter of the shielding jacket (32); the shielding jacket (32) freed from the outer cable jacket (31) is inserted into this boring (28); inserted into the end (33) of the shielding jacket (32) is a metal sleeve (36) whose outer diameter corresponds to the inner diameter of the shielding jacket (32, 32*a*); and in the area of the sleeve (36) inserted into the boring (28) the seat is compressed from the outside in order to reduce the cross-section and thereby secure the shielding jacket (32).

2. A sensing device according to claim 1, wherein on its end that projects into the housing (10) the seat (20) exhibits a shoulder (22) that is narrower than the remaining cross-section of the seat (20) and said shoulder (22) can be compressed from its outer jacket face (32) in a direction perpendicular to the center axis (29).

3. A sensing device according to claim 1, wherein on its end that projects into the housing (10) the sleeve (36) exhibits a flanged rim (37), which rests against the face of the seat, specifically against the seat shoulder (22), together with the likewise flanged end (34) of the shielding jacket (32).

* * * * *